May 10, 1932. B. G. W. WOLFF ET AL 1,857,705
VENTILATING ARRANGEMENT FOR AUTOMOBILE HOODS
Filed April 8, 1931
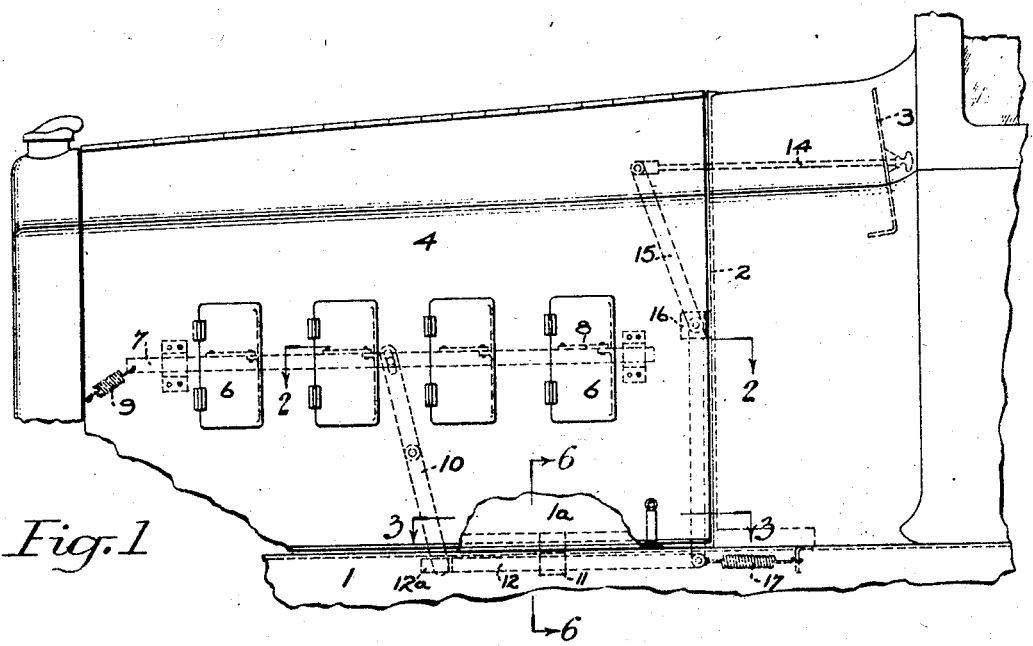
Fig. 1
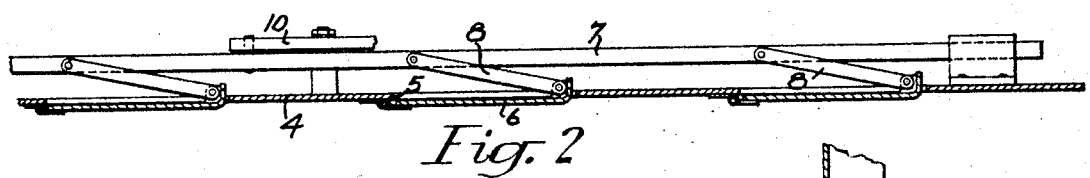
Fig. 2
Fig. 3
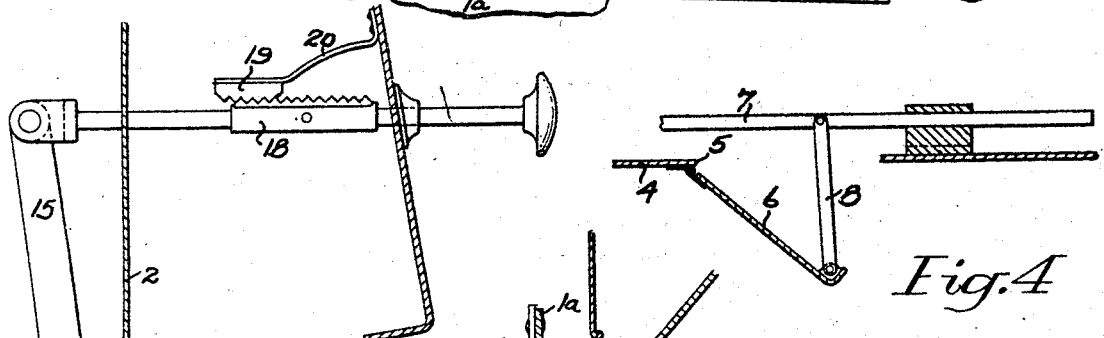
Fig. 4
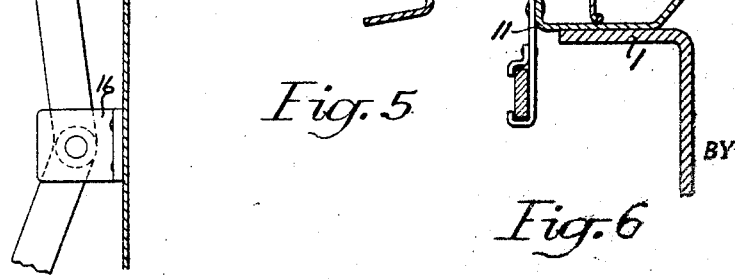
Fig. 5
Fig. 6
INVENTORS
Bruno. G. W. Wolff
Wilhelm C. F. Wolff
BY
ATTORNEY.

Patented May 10, 1932

1,857,705

UNITED STATES PATENT OFFICE

BRUNO G. W. WOLFF AND WILHELM C. F. WOLFF, OF DEARBORN, MICHIGAN

VENTILATING ARRANGEMENT FOR AUTOMOBILE HOODS

Application filed April 8, 1931. Serial No. 528,524.

This invention relates to improvements in ventilating arrangements for automobile hoods. It is an object of the invention to provide such a device wherein means readily accessible within the body of the vehicle are provided for opening and closing shutters in the hood.

Another object of the invention is to provide such an automobile hood ventilating arrangement wherein the parts are relatively so arranged that the side of the hood may be raised without the interference of any of the cooperating parts, or the necessity of having to first uncouple them.

A further object of the invention is to provide means by which the shutters in the hood are automatically moved to closed position as the hood side in which they are arranged is raised.

With these and other objects and advantages in view which will hereinafter become apparent, the invention is now more fully described with the aid of the accompanying drawings, in which:

Figure 1 illustrates a side elevation of a portion of an automobile to which the invention is applied.

Figures 2 and 3 are enlarged sections on the lines 2—2 and 3—3 of Figure 1.

Figure 4 is an enlarged sectional detail showing a shutter in open position.

Figure 5 is an enlarged view of the operating rod showing a means for holding the latter in adjusted position.

Figure 6 is an enlarged section on the line 6—6 of Figure 1.

Referring to the drawings, 1 designates a portion of an automobile frame and 1a a portion of a front fender, 2 is a dash board, 3 an instrument board, and 4 a hood. Each side of the latter has a plurality of aligned ventilating apertures 5 formed therethrough, and 6 denotes shutters pivotally mounted on the hood sides so that they may close the apertures 5. Since the construction and arrangement of parts for actuating the shutters is the same on both sides of the hood and vehicle, I will describe my structure with reference to one side only.

Horizontally slidable on the inner side of the hood 4, and preferably intermediately of the height of the apertures 5 is a member 7. Extending inwardly from each shutter 6 and pivotally connected thereto is an arm 8 the inner extremity of which is pivotally connected to the member 7 so that when the latter is moved longitudinally the shutters are turned about their axes and opened or closed. One extremity of a spring 9 is secured to the member 7 and its opposite extremity is secured to the inner side of the hood 4. This spring tends to move the said member forwardly so that the shutters 6 are returned to their closed position.

On the inner side of the hood 4 a lever 10 is pivotally mounted intermediately of its length. Its upper extremity is so connected to the member 7 that forward movement of the lower extremity of the said lever moves the member 7 rearwardly against the tension of the spring 9 and causes the shutters 6 to open. The lower extremity of the said lever preferably extends below the side of the hood 4. The action of the spring 9 thus tends to hold the lever 10 in the position shown in Figure 1.

To the inner upturned extremity of the front fender 1a a guide 11 is secured through which an element 12 is longitudinally slidable. Extending forwardly through the instrument board 3 and dash 2 is an operating rod 14 to the front extremity of which the upper extremity of a connecting link 15 is pivotally fastened. This link, intermediately of its length, is pivotally supported by a bracket 16 mounted on the front of the dash 2, and at its lower extremity is pivotally connected to the rear extremity of the element 12. The latter is bifurcated at its front extremity as shown at 12a to receive the lower end of the lever 9 between its bifurcations.

One extremity of a spring 17 is secured to any suitable portion of the vehicle such as the underside of the floor boards indicated at 17a. The opposite end of the spring 17 is secured to the lower extremity of the lever 15 thereby tending to move the latter and the element 12 into the position shown in Figure 1.

In order to hold the operating rod 14 at any desired setting a rack 18 is provided thereon which coacts with a corresponding rack 19 supported by a spring 20 from the instrument board 3. This, or any preferred equivalent structure, is employed for preventing accidental movement of the operating rod 14 and the other parts with which it cooperates and which are subjected to the tension of the springs 9 and 17.

From the foregoing it will be readily seen that when the rod 14 is moved rearwardly the element 12 is moved forwardly. Then the base of the bifurcated portion 12a moves the lower extremity of the lever 10 forward, thereby causing the member 7 to move rearwardly so that the shutters 6 are opened. By movement of the operating rod 14 in the opposite direction—namely forwardly—the element 12 is moved rearwardly; when this occurs the spring 9 moves the member 7 forwardly thereby closing the shutters 6 and causing the lower extremity of the lever 10 to travel rearwardly substantially in engagement with the base of the bifurcated portion 12a of the element 12. It will also be observed that if the shutters 6 are open and the side of the hood raised the shutters are closed by the action of the spring 9 as soon as the hood is lifted sufficiently for the lever 10 to become disengaged from the bifurcation 12a. Moreover should the operating rod 14 be in rearward position when the hood is raised it is merely necessary to return it to its forward position before again lowering the hood, then the lever 10 will reengage the bifurcation 12a.

While the mechanism will operate successfully without the spring 17 we prefer that it be utilized as it eliminates noise which might otherwise occur when the vehicle is in motion.

While in the foregoing the preferred embodiment of the invention has been described and shown, it is understood that the construction described is susceptible to such alterations and modifications as fall within the scope of the appended claims.

What we claim is:

1. An arrangement of the character described comprising an apertured hood, shutters, a member movable on said hood by the movement of which said shutters open and close said hood apertures, a lever pivoted on said hood and connected to said member, and spring means tending to move said shutters to closed position relative to said hood apertures, in combination with a frame, an element movable longitudinally of said frame, means on said element for engaging and moving said lever when said element is moved in one direction, and means for moving said element.

2. An arrangement of the character described comprising an apertured hood, shutters, a member movable on said hood by the movement of which said shutters open and close the hood apertures, a lever pivoted on said hood and connected to said member, and spring means tending to move said shutters to closed position relative to said hood apertures and to turn said lever in one direction, in combination with a frame, an element movable longitudinally on said frame, means on said element for engaging and moving said lever against the tension of said spring when the element is moved in one direction, and means for moving said element.

3. An arrangement of the character described comprising an apertured hood, shutters, a member movable on said hood by the movement of which said shutters open and close the hood apertures, a lever pivoted on said hood and connected to said member, and spring means tending to hold said shutters in closed position relative to said apertures, in combination with a frame, an element bifurcated at one extremity slidable on said frame, said bifurcated extremity engaging said lever and moving it in one direction when said element is moved in one direction, and means for moving said element.

4. In an arrangement of the character described, the combination of a frame, a body mounted thereon, an operating rod slidable in said body, an element longitudinally movable on said frame, means connecting said rod with said element, a hood having apertures therein, shutters adapted to close said apertures, said hood being substantially centrally and longitudinally hinged and mounted over a portion of said frame so that either side thereof may be raised, a member slidable on said hood by movement of which said shutters open and close said apertures, a lever pivoted on said hood and connected to said member, said lever being adapted to be engaged by one extremity of said element so that movement of the latter in one direction opens said shutters, said lever becoming disengaged from said element when the hood side is raised about its hinges, and spring means tending to hold said lever in engagement with said element when the hood side is lowered.

BRUNO G. W. WOLFF.
WILHELM C. F. WOLFF.